T. M. BOGGS.
BORING, REAMING, AND TAPPING MACHINE.
APPLICATION FILED JAN. 11, 1909.

979,418.

Patented Dec. 27, 1910.
2 SHEETS—SHEET 1.

WITNESSES.

INVENTOR.

T. M. BOGGS.
BORING, REAMING, AND TAPPING MACHINE.
APPLICATION FILED JAN. 11, 1909.

Patented Dec. 27, 1910.
2 SHEETS—SHEET 2.

UNITED STATES PATENT OFFICE.

THADDEUS M. BOGGS, OF MONONGAHELA, PENNSYLVANIA.

BORING, REAMING, AND TAPPING MACHINE.

979,418.

Specification of Letters Patent.   Patented Dec. 27, 1910.

Application filed January 11, 1909.   Serial No. 471,737.

*To all whom it may concern:*

Be it known that I, THADDEUS M. BOGGS, a resident of Monongahela, in the county of Washington and State of Pennsylvania, have invented a new and useful Improvement in Boring, Reaming, and Tapping Machines; and I do hereby declare the following to be a full, clear, and exact description thereof.

My invention relates to metal boring machines adapted also for use in connection with metal drilling, tapping and like machines.

The object of the present invention is to improve certain features of the type of machine described and claimed in Letters Patent of the United States No. 920,011, granted to me April 27, 1909. That machine comprised, generally stated, a driven spindle with a tool socket carried thereby, said spindle being adapted to rotate and slide in suitable bearings and a feed screw parallel to the spindle with gearing connections between the spindle and screw and means for disconnecting the same, together with a split nut carried by the spindle and means for throwing said nut into and out of engagement with the feed screw. In that device in order to throw the split nut into and out of engagement with the feed screw it was necessary for the operator to be stationed at the point at which the split nut was located on the feed screw in order to throw it into or out of engagement with said feed screw. This was a matter of considerable trouble and inconvenience as it was necessary for the operator to walk to the outer end of the spindle each time the split nut was to be opened or closed, and the object of my present invention is to provide for the operation of the split nut from the operator's regular position at the forward end of the machine, thereby doing away with the necessity of walking back and forth each time the nut was to be engaged or disengaged.

To these ends my invention comprises the novel features hereinafter set forth and claimed.

Figure 1:
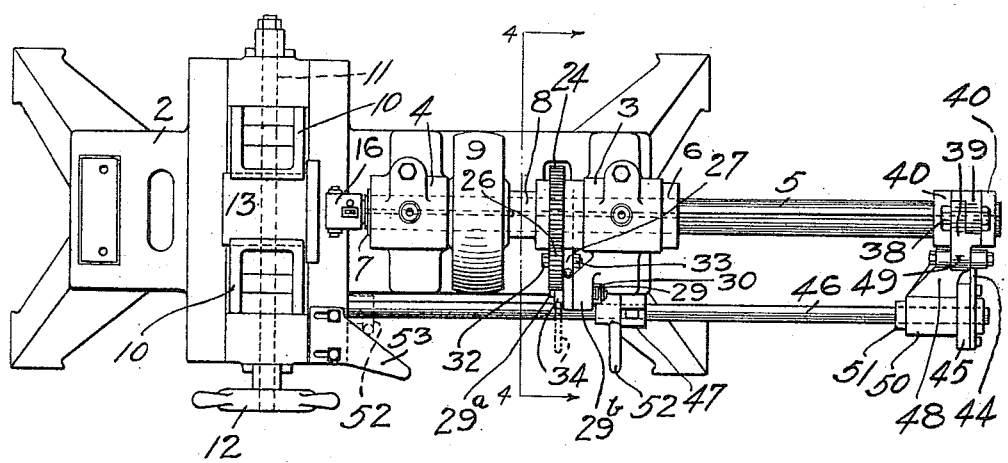
Figure 2:
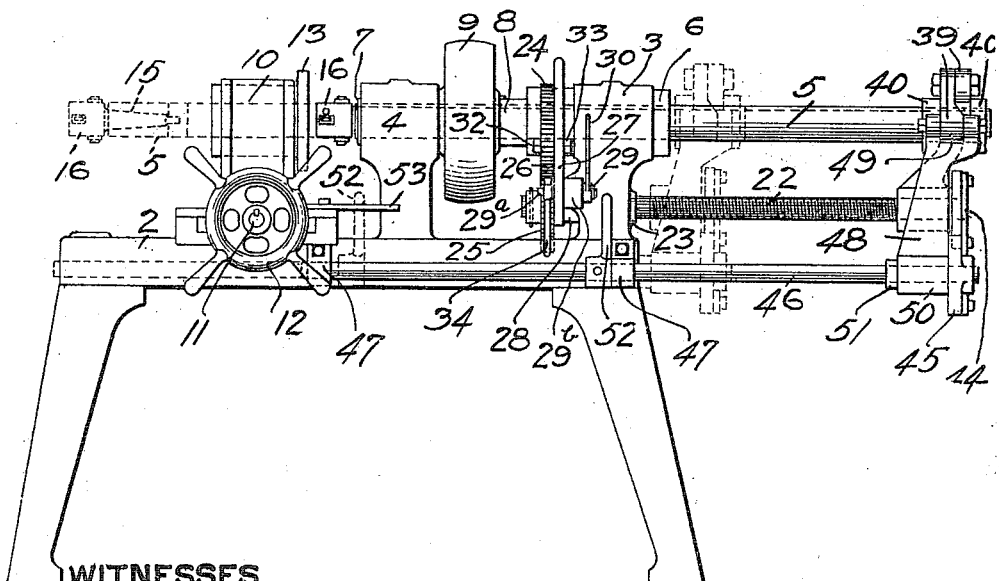
Figure 3:
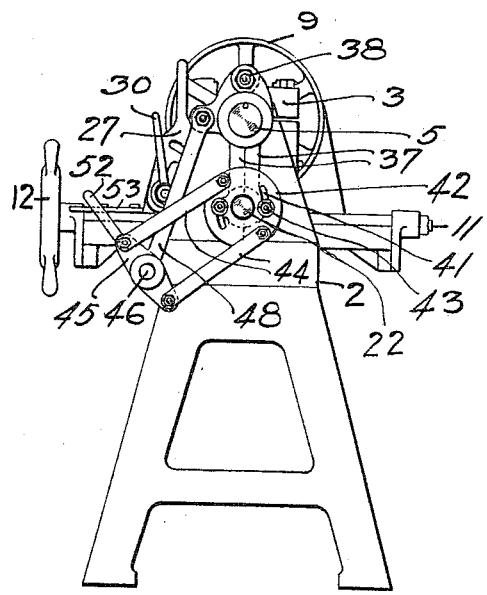
Figure 4:
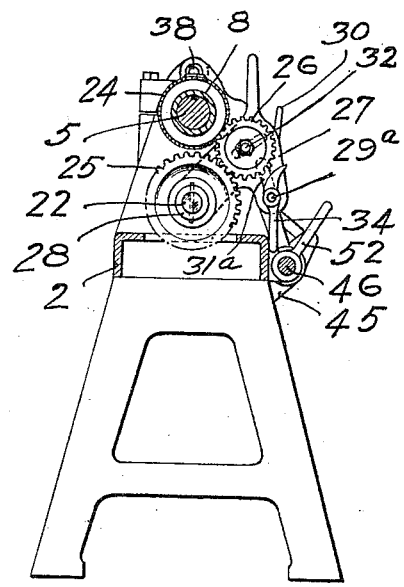
Figure 5:
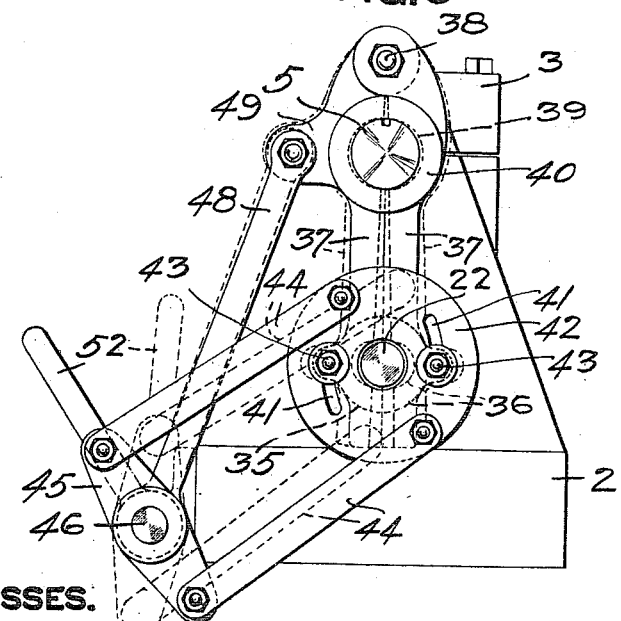
Figure 6:
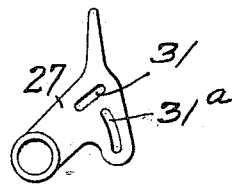

In the accompanying drawings Figure 1 is a plan view of a boring machine embodying my invention; Fig. 2 is a side view; Fig. 3 is an end view; Fig. 4 is a section on the line 4—4 Fig. 1 looking in the direction of the arrows; Fig. 5 is an enlarged end view of a portion of the machine, and Fig. 6 is a detail.

In the drawings I have illustrated my invention as applied to a boring machine but it is apparent that with slight modification it can also be readily applied to drilling or tapping machines.

In the drawings the numeral 2 designates a suitable stand or support and mounted on said stand are the housings 3 and 4. The spindle or shaft 5 is rotatably mounted in bearings 6 and 7 in the housings 3 and 4. The spindle has a spline connection with a sleeve 8 located between the bearings 6 and 7, and which serves as the means for transmitting power or rotary movement to the spindle 5. This rotary movement may be obtained from any suitable source of power, the drawing showing for this purpose a belt pulley 9 to be connected up by belting to a suitable motor or engine.

The chuck is shown as comprising jaws 10 actuated by a screw 11 carrying a hand wheel 12, said chuck being shown as holding a bearing 13 constituting the work being operated on. The holding chuck may of course vary according to the work desired.

The end of the spindle 5 is provided with a socket 15 adapted to carry various forms of standard tools, said socket being shown as provided with an ordinary boring tool 16.

The feeding mechanism comprises the feed screw 22 mounted in a bearing 23 and extending parallel to the standard 5. This screw is driven from the spindle 5 by any suitable gearing, that shown comprising a gear 24 secured on the sleeve 8, a gear wheel 25 secured to the screw 22 and an intermediate gear 26 carried by the plate 27. This plate 27 is carried by the hub 28 on the housing 3 and a lock nut 29 is adapted to secure said plate in position, said lock nut engaging a pin 29$^a$ passing through a slot 31$^a$ in said plate and a lug 29$^b$ on the housing. The lock-nut is provided with the handle 30. The plate 27 has the slot 31 which receives the stud 32 on the gear wheel 26 as shown in Fig. 6. A lock nut 33 is adapted to secure the gear 26 at any desired point in the slot 31. By means of the plate 27 the feed screw may be thrown out of engagement with the driving gear and the device operated by hand power where it is desired to use the machine for facing or drilling where a slow feed is desired. A hand-ratchet 34 is employed under these conditions, said hand ratchet being mounted on the pin 29ᵃ and adapted to engage the large gear wheel 25 on the feed screw and by means of this hand ratchet the feed screw may be fed by hand at slow speed.

As in my former application above referred to, the feeding connection between the feed screw 22 and spindle 5 is secured by a suitable split nut engaging the screw and comprising the two nut sections 35 and 36 carried at the lower ends of the arms 37 which are pivoted together at 38. These arms 37 are provided with the semi-circular portions 39 which embrace the spindle 5 and the nut sections are held against longitudinal movement on said spindle by means of collars 40 secured to the spindle 5 and lying on either side of the curved portions 39 of the arms 37. The split nut is locked in its closed position when in engagement with the feed screw 22 by means of eccentric or cam slots 41 on a disk 42. This disk 42 is held concentric with the screw by means of the studs 43 on the nut sections 35 and 36 and consequently said disks 37 do not engage the threads of the feed screw. Connected to opposite sides of the center of the disk 42 are the links 44 which are connected to opposite ends of the arm 45. This arm 45 is secured to a shaft 46 which extends parallel with the feed screw and spindle and said shaft extends substantially the entire length of the machine, being adapted to rotate and slide in suitable bearings 47. The boring bar 5 is connected up to the rod 46 by means of the arm 48, said arm being pivoted to the lug 49 on one of the arms 37 of the split nut. The arm 48 is connected to the sleeve 50 held between the arm 45 and the collar 51. A handle 52 is secured to the rod 46 and by means of said handle said rod may be rocked or moved back and forth as desired. This handle is preferably secured so as to be readily adjustable at any point on the rod 46 and the distance of the feed of the spindle is controlled automatically. The cam-plate 53 is in the path of the handle 52 and acts to release the nut from screw-bar.

From the above it will be apparent that when the machine is in operation and it is desired to throw the split-nut into engagement with the feed-screw the operator standing adjacent to the handle 52 by grasping said handle and rocking it so operates the links 44 as to rotate the disk 42 in the proper direction to throw the parts of the feed-nut 35 and 36 together to engage the feed-screw. Power will then be transmitted to feed the boring bar or spindle. When, on the other hand, the operator desires to stop the feed it is only necessary to grasp the handle 52 and rotate the rod 46 so as to throw the feed-nut sections out of engagement with the feed screw whereupon the feeding of the boring bar ceases. At the same time from the same position the operator by grasping the handle 52 when the feed nut is out of engagement may slide the rod 46 in either direction to move the boring bar or spindle in either direction to any desired extent. The operator, therefore, from one position, without moving from one end of the machine to the other, is able to control the feed by the operation of the same handle and move the boring bar or spindle at will. By having the handle 52 adjustable it may be set at any desired point on the rod 46 and in this manner the distance of feed may be automatically controlled, as the handle will come in contact with the cam-plate and stop the feed. Furthermore, if it is desired to operate the machine by hand where it is desired to employ the machine for facing or drilling at slow speed, the operator by loosening the lock nut 29 may throw the plate 27 out so as to throw the gear 26 out of engagement with the gear 24. It is then possible by means of the hand ratchet 34 to feed the feed screw and boring bar connected therewith at a slow speed such as is desirable in facing.

What I claim is:

1. In boring and like machines, the combination of a rotary and longitudinally movable spindle, a feed-screw parallel thereto, driving connections between said spindle and screw, a feeding device carried by said spindle at the outer end thereof, a longitudinally extending rod, and connections between said rod and said feeding device, whereby said feeing device may be thrown into and out of engagement with said feed-screw.

2. In boring and like machines, the combination of a rotary and longitudinally movable spindle, a feed-screw parallel to said spindle, driving connections between said spindle and screw, a split-nut carried by the spindle, a longitudinally extending operating rod, and connections between said rod and said split nut, whereby said nut may be thrown into and out of engagement with said feed-screw.

3. In boring and like machines, the combination of a rotary and longitudinally movable spindle, a feed-screw parallel thereto, driving connections between said spindle and screw, a split nut carried by the spindle, a longitudinally movable rotatable rod, and connections between said rod and said split-nut, whereby said nut may be thrown into and out of engagement with said feed-screw.

4. In boring and like machines, the combination of a rotary and longitudinally movable spindle, a feed screw parallel thereto, driving connections between said spindle and screw, arms pivotally connected together and embracing said spindle to move longitudinally therewith, means for holding said arms against independent longitudinal movement on said spindle, nut sections carried by said arms, a disk connected with and slidable along said screw and provided with a pair of oppositely arranged cam slots, studs carried by the nut sections and projecting into said slots, a longitudinally movable rod and connections between said rod and said disk, whereby said split nut may be thrown into and out of engagement with said feed screw.

5. In boring and like machines, the combination of a rotary and longitudinally movable spindle, a feed screw parallel thereto, driving connections between said spindle and screw, arms pivotally connected and embracing said spindle to move longitudinally therewith, means for holding said arms against independent longitudinal movement on said spindle, nut sections carried by said arms, a disk connected with and slidable along said screw and provided with a pair of oppositely arranged cam slots, studs carried by the nut sections and projecting into said slots, a longitudinally movable rotatable rod, an arm on said rod and links connecting opposite ends of said arm to said disk at opposite sides of the center thereof, whereby said nut may be thrown into and out of engagement with said feed screw.

6. In boring and like machines, the combination of a rotary and longitudinally movable spindle, a feed screw parallel thereto, driving connections between said spindle and screw, arms pivotally connected together and embracing said spindle to move longitudinally therewith, means for holding said arms against independent longitudinal movement on said spindle, nut sections carried by said arms, a disk connected with and slidable along said screw and provided with a pair of oppositely arranged cam slots, studs carried by the nut sections and projecting into said slots, a longitudinally movable rod, an arm at the outer end of said operating rod, links connecting the opposite sides of said arm to said disk at opposite sides of the center thereof, and a second arm on said rod pivoted to one of said pivotally connected arms.

7. In boring and like machines, the combination of a rotary and longitudinally movable spindle, a feed screw parallel thereto, driving connections between said spindle and screw, arms pivotally connected together and embracing said spindle to move longitudinally thereof, means for holding said arms against longitudinal movement on said spindle, nut sections carried by said arms, a longitudinally movable rotatable rod, and means for opening and closing said nut sections by said rod.

8. In boring and like machines, the combination of a rotary and longitudinally movable spindle, a feed screw parallel thereto, driving connections between said spindle and screw, a feeding device carried by said spindle at the outer end thereof, a longitudinally extending rod, connections between said rod and said feeding device, whereby said feeding device may be thrown into and out of engagement with said feed screw, an adjustable handle on said rod, and a cam in the path of said handle.

In testimony whereof, I the said THADDEUS M. BOGGS have hereunto set my hand.

THADDEUS M. BOGGS.

Witnesses:
 ROBERT C. TOTTEN,
 JOHN F. WILL.